United States Patent [19]

Schmittbetz et al.

[11] Patent Number: 5,036,652
[45] Date of Patent: Aug. 6, 1991

[54] SELF-PROPELLED HARVESTER

[75] Inventors: Klaus Schmittbetz, Höchstädt; Ulrich Liebers, Neuss, both of Fed. Rep. of Germany

[73] Assignee: Kloekner-Humboldt-Deutz AG, Cologne, Fed. Rep. of Germany

[21] Appl. No.: 554,281

[22] Filed: Jul. 17, 1990

[30] Foreign Application Priority Data

Jul. 17, 1989 [DE] Fed. Rep. of Germany ....... 3923637
Dec. 8, 1989 [DE] Fed. Rep. of Germany ....... 3940673

[51] Int. Cl.⁵ ............................................. A01D 56/20
[52] U.S. Cl. ...................... 56/16.4; 56/122; 460/114
[58] Field of Search ................. 56/16.4–189, 56/122, 192; 460/111, 114, 901

[56] References Cited

U.S. PATENT DOCUMENTS

| 4,858,419 | 8/1989 | Bernier | 56/189 |
| 4,903,463 | 2/1990 | Linde et al. | 56/16.4 |
| 4,914,909 | 4/1990 | Linde et al. | 56/16.4 |

FOREIGN PATENT DOCUMENTS

| 0014707 | 9/1980 | European Pat. Off. . |
| 0205206 | 12/1986 | European Pat. Off. . |
| 2107575 | 9/1971 | Fed. Rep. of Germany . |
| 2917191 | 11/1979 | Fed. Rep. of Germany . |
| 3818904 | 12/1988 | Fed. Rep. of Germany . |

Primary Examiner—Terry Lee Melius
Attorney, Agent, or Firm—Sprung Horn Kramer & Woods

[57] ABSTRACT

A self-propelled harvester, in particular for green fodder, comprises a cutter bar, an auger, a conveyor belt, a first crop conditioning device, a transport belt, a buffer space, a dosing roller, a second crop conditioning device, and a depositing belt for depositing the harvested and conditioned fodder onto the ground in the form of a substantially endless mat. The first conditioning device serves to injure the outer cellulose layer of the crop stems and blades; the second conditioning device serves to press the crop into a mat of substantially uniform thickness and width.

19 Claims, 2 Drawing Sheets

SELF-PROPELLED HARVESTER

BACKGROUND OF THE INVENTION

The present invention relates to a self-propelled harvester, in particular a harvester for cutting and conditioning green fodder.

German Patent No. 21 07 575 discloses a self-propelled swath forming mower having conditioning means and a cutter table with a cutting mechanism and a reel.

German Patent Publication No. OS 38 18 904 discloses a mowing device having a cutter bar, for use, for example, in a motor-driven "push" harvester having a motor of its own, a driver's seat and a steering wheel.

German Patent No. 29 17 191 describes a self-propelled mower having a conditioning arrangement comprising a plurality of rollers and a plurality of rotating brushes, as well as a conveyor belt and a mat-forming roller.

European Patent No. EP-A 205 206 discloses a harvester having a multiplicity of rollers and a pair of conveyor belts for conditioning the crop.

Finally, European Patent No. 14 707 discloses a machine for conditioning cut grass, the conditioning means having a brush-like structure with a multiplicity of elastic elongate elements.

These known harvesters have economized the harvest and conservation of fodder in terms of both its nutritive value and the energy consumed. However, the field drying time that can be achieved therewith often does not suffice for hay or silage, particularly under the poor weather conditions prevalent in Central Europe.

SUMMARY OF THE INVENTION

The principal object of the present invention is to provide a self-propelled harvester, in particular for green fodder, that can substantially shorten the crop harvesting time and thereby not only save energy but also largely avoid the weather risk.

This object, as well as other objects which will become apparent from the discussion that follows, are achieved, according to the present invention, by providing a method and apparatus for conditioning a green cut crop (fodder), to reduce its drying time, by means of the following two conditioning steps:

(1) injuring the outer cellulose layer of the crop stems and blades; and (2) pressing the crop, so conditioned, into a mat.

According to a preferred feature of the invention, the width and thickness of the endless mat are controlled to maintain them substantially constant.

According to a preferred embodiment to the invention, the two crop conditioning steps are carried out by a self-propelled harvester which cuts and conditions green fodder. This harvester includes:

(a) a crop cutting device having a cutter bar extending perpendicular to the direction of travel of the harvester;

(b) a conveyor belt, disposed behind the cutting device, for conveying the cut crop rearward;

(c) a first crop conditioning device, disposed behind the conveyor belt, for injuring the outer cellulose layer of the crop stems and blades;

(d) a transport belt, disposed behind the first crop conditioning device, for transporting the conditioned crop rearward;

(e) an enclosure defining a crop buffer space disposed above the transport belt;

(f) a dosing roller disposed above the transport belt and rearward of the buffer space;

(g) a second crop conditioning device, disposed rearward of the transport belt, for pressing the pre-conditioned crop into a mat; an (h) a depositing belt for depositing the harvested and conditioned crop onto the ground in the form of the endless mat.

The harvester according to the present invention is capable of reducing the field drying time to a few hours by virtue of the thorough disintegration and mat formation of the crop, allowing not only for a one-day fodder harvest, but even for a half-day fodder harvest, so that brief periods of fine weather are sufficient for harvesting the crop. The total energy demand for cutting, conditioning and mat formation is considerably lower than with conventional harvesters since the yield per unit area of the harvestable fodder is greatly increased.

The invention will now be explained in detail with reference to the drawings which show schematically certain advantageous preferred embodiments.

DESCRIPTION OF THE PREFERRED EMBODIMENTS

Figure 1:
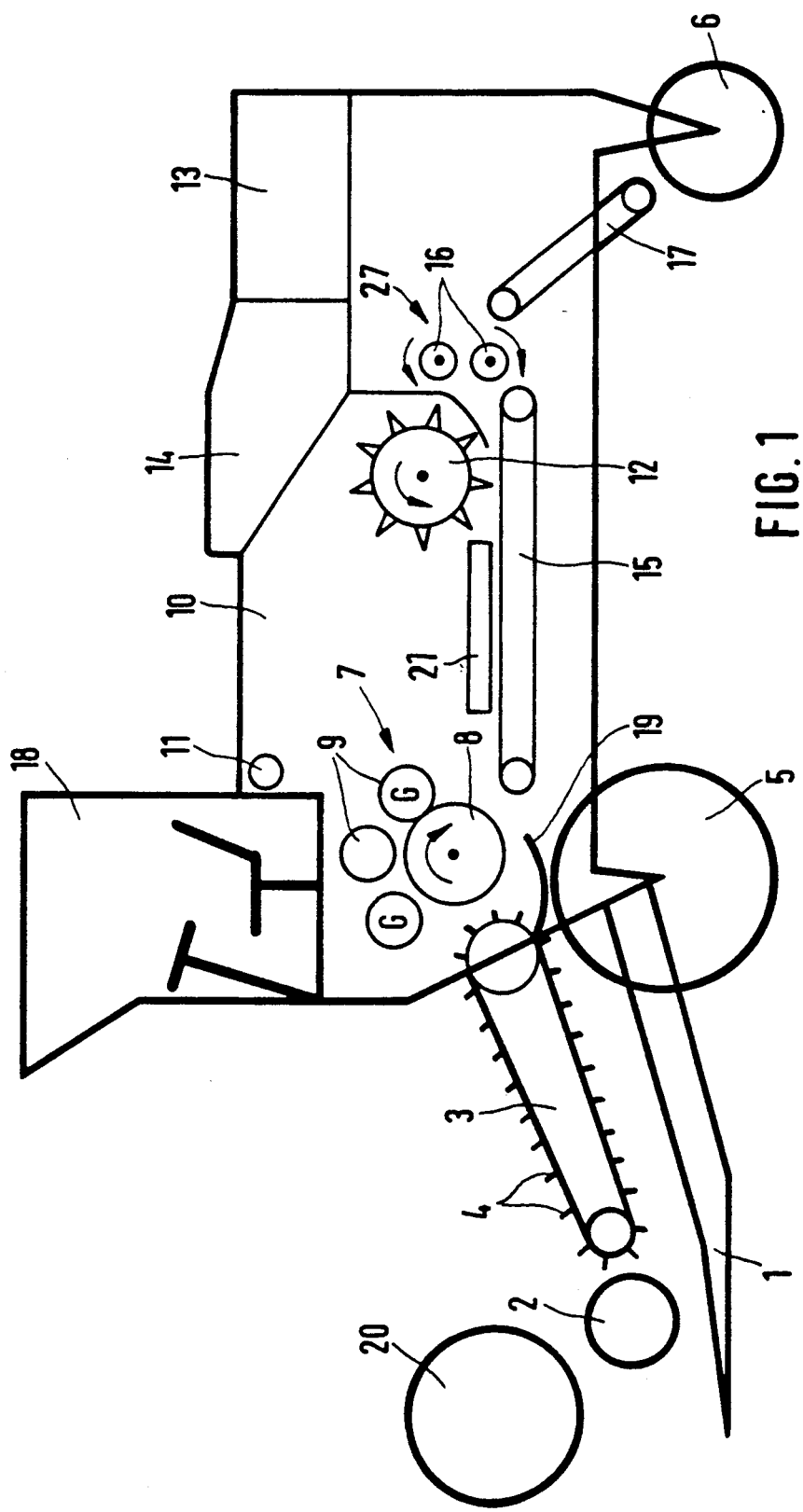
FIG. 1 shows a longitudinal section of the self-propelled harvester according to the present invention.

FIG. 1 shows schematically a longitudinal section of a self-propelled harvester according to the invention. This harvester comprises a cutting mechanism 1, such as a cutter bar and table as is known from combine-harvester machines. A possible width of the cutter bar is 3.0 m, so that this self-propelled harvester with the mounted cutter bar can be moved on public roads without any special legal requirements or permits. Above the cutter bar is a conventional auger 2 serving to feed the crop to a conveyor belt 3 which takes up the cut crop with the aid of elastic brushes 4 and transports it to a first crop conditioning unit 7. A reel 20 may be disposed above the auger 2 as a further feeding aid. The cutter bar itself may be replaced by a drum cutter or a rotary cutter.

This first conditioning unit 7, advantageously comprises a cutting edge roller 8 and a multiplicity of planetary serrated rollers 9 of small diameter which encircle the roller 8 along part of its periphery and are spaced therefrom, their direction of rotation being opposite to that of roller 8. The rotating speed of the planetary serrated rollers may be different from that of the cutting edge roller. In accordance with the distance between the cutting edge roller and the planetary serrated rollers, whose axes are disposed parallel to each other, a first thorough conditioning of the crop is performed by injuring the outer cellulose layer in the stems and blades of the cut green fodder. The crop, thus disintegrated, is deposited by the first conditioning unit 7 onto a substantially horizontal transport belt 15, a buffer space 10 being provided above this belt for taking up the excess crop. Also above transport belt 15 and to the rear of the buffer space 10 is a dosing roller 12 for feeding the crop to a second crop conditioning unit 27, which preferably comprises a pair of oppositely rotating press rollers 16, spaced apart one above the other in a vertical plane. The crop passes through, and is pressed together by this second conditioning unit 27, being formed thereby into a mat with a thickness of preferably 6 to 10 mm. The cell sap adhering to the fibers also binds the fine parts of the crop—that is, the small fibers and particles of the conditioned stems and blades—to the mat, provided that a sufficient pressing force is exerted by the conditioning unit 27 on the crop passing through it. Thereafter, the crop, shaped into a mat, is deposited on the ground by a conveyor belt 17 disposed at an angle to the ground.

Reference numbers 5 and 6 designate the front and rear wheels, respectively, of the self-propelled harvester; 18 designates a driver's cab with a steering wheel and a control panel; 13 an engine, e.g., a diesel engine; 14 a fuel tank and 11 an intermediate drive shaft connected with the engine 13.

The dosing roller 12 disposed above transport belt 15 has the function of ensuring that the crop is conveyed evenly to the second conditioning unit 27 and charges the latter at a constant rate. An uneven feed is compensated by the buffer space 10 disposed ahead of the dosing roller 12. The rotating speed of the dosing roller is preferably adjustable, to allow an overfilled buffer space 10 to be emptied faster if necessary.

The reference number 19 designates a stone trap which is preferably provided below the entrance gap between the conveyor belt 3 and the first conditioning unit 7.

The engine 13 of the self-propelled harvester is preferably connected via the intermediate shaft 11 to the rollers 8, 9 of the first conditioning unit 7, the conveyor belt 3, the ground wheels 5 and 6, as well as the cutter bar 1 and reel 2, to drive these parts by engine power.

All-wheel drive is also possible for heavy-duty applications.

The transport belt 15, dosing roller 12, second conditioning unit 27—i.e., the two press rollers 16 for forming a mat—and the depositing belt 17 are advantageously driven together with, or by, the rear wheel 6 via a suitable gearing, not shown in detail, so that their operating speed is a function of the ground speed of the self-propelled harvester and the mat is deposited only during travel. To allow for adaptation of the depositing speed of the mat on the ground, the speed of the transport belt 15 is adjustable by means of the gearing.

The width of the self-propelled harvester is preferably one-third to one-quarter of the width of cut of the cutter bar, to allow for a compact construction of the machine.

The driver's area, i.e., the cab, is preferably disposed above first conditioning unit 7 to ensure good vision both onto the cutter bar as well as the crop.

Figure 2:
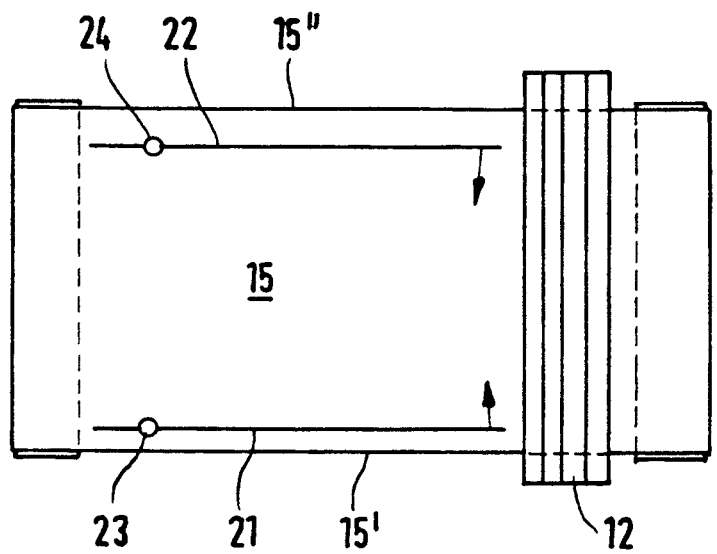
FIG. 2 shows a top view of the transport belt in the harvester of FIG. 1, according to one preferred embodiment.

FIG. 2 shows a top view of the transport belt 15, according to one embodiment, whereby movable, vertically disposed guide plates 21, 22 extending substantially parallel to the transport belt are provided in the vicinity of the respective outer edges 15', 15" of the belt for adjusting the width of the mat of crop. Electric, hydraulic or mechanical swivel means (not shown) are used to swing the two guide plates 21, 22 about two substantially vertical axes 23, 24 in the directions of the two arrows (and opposite thereto), so that the width of the mat fed by dosing roller 12 to the second conditioning unit 27 is variable.

Figure 3:
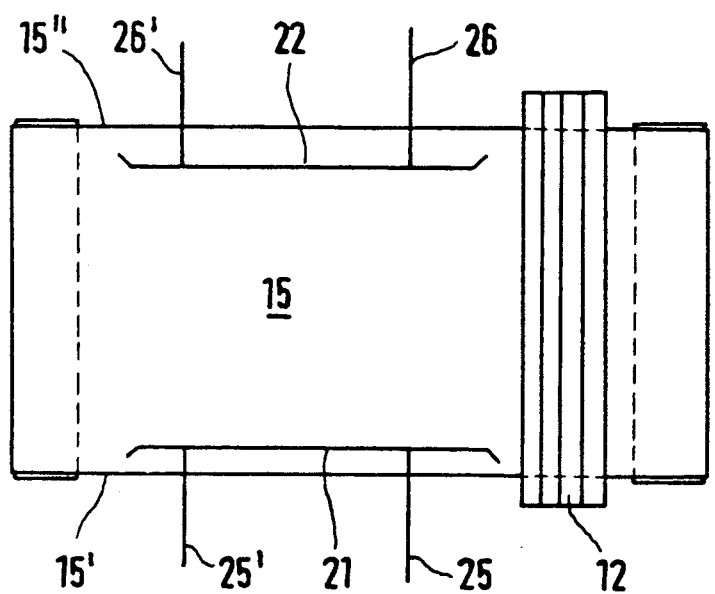
FIG. 3 shows a top view of the transport belt in the harvester of FIG. 1 according to another preferred embodiment.

FIG. 3 shows a top view of the transport belt 15, according to another embodiment, whereby movable, vertically disposed guide plates 21, 22 extending substantially parallel to the transport belt are disposed in the vicinity of the respective outer edges 15', 15" of the belt. In order to adjust the width of the mat of crop, the two guide plates 21, 22 are displaceable by means of push-pull rods 25, 25' and 26, 26' perpendicular to the longitudinal axis of transport belt 15. The push-pull rods may also be operated electrically, hydraulically or mechanically.

There has thus been shown and described a novel self-propelled harvester which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

We claim:

1. A self-propelled harvester for cutting and conditioning green fodder comprised of crop stems and blades, said harvester being arranged to travel by means of ground wheels over a crop field and comprising, in combination:
    (a) crop cutting means having a cutter bar extending perpendicular to the direction of travel of said harvester;
    (b) a conveyor belt, disposed rearward of the cutting means for conveying the cut crop rearward;
    (c) first crop conditioning means, disposed rearward of the conveyor belt, for injuring the outer cellulose layer of the cut crop stems and blades;
    (d) a transport belt, disposed rearward of the first crop conditioning means, for transporting the preconditioned crop rearward;
    (e) an enclosure defining a crop buffer space disposed above the transport belt;
    (f) a dosing roller disposed above the transport belt and rearward of the buffer space;
    (g) second crop conditioning means, disposed rearward of the transport belt and the dosing roller, for pressing the preconditioned crop into a mat; and
    (h) a depositing belt for depositing the harvested and conditioned crop onto the ground in the form of a substantially endless mat.

2. The harvester defined in claim 1, further comprising an auger, disposed above and rearwardly of the cutter bar, for feeding the cut crop to the conveyor belt.

3. The harvester defined in claim 1, further comprising a rotatable reel disposed above the cutter bar.

4. The harvester defined in claim 1, wherein the conveyor belt is provided with a multiplicity of elastic brushes.

5. The harvester defined in claim 1, wherein the conveyor belt consists of chains with beating arms.

6. The harvester defined in claim 1, wherein a stone trap is disposed below the conveyor belt.

7. The harvester defined in claim 1, wherein the first conditioning means comprises a cutting edge roller and a multiplicity of planetary serrated rollers rotatable in the opposite direction to the cutting edge roller and disposed along part of the periphery of the cutting edge roller at a distance therefrom in such a way that their axes extend parallel to that of the cutting edge roller, all roller axes being aligned substantially perpendicular to the direction in which the crop is conveyed.

8. The harvester defined in claim 1, wherein the first conditioning means comprises a cutting edge roller and a multiplicity of planetary serrated rollers rotatable in the opposite direction to the cutting edge roller and disposed along part of the periphery of the cutting edge roller at a distance therefrom in such a way that their axes extend parallel to that of the cutting edge roller, all roller axes being aligned at an angle to the direction in which the crop is conveyed.

9. The harvester defined in claim 1, wherein the second conditioning means comprises a pair of press rollers, rotating in the opposite direction to each other and spaced apart one above the other in the vertical direction, for producing a mat of crop.

10. The harvester defined in claim 1, further comprising an engine and an intermediate drive shaft coupled to the engine, and wherein the first conditioning means, the conveyor belt, at least two ground wheels of the harvester, and the cutter bar are connected mechanically or hydraulically with the driving engine of the harvester via the intermediate shaft.

11. The harvester defined in claim 1, wherein the transport belt, the dosing roller, the depositing belt and the second crop conditioning means are connected via a gearing with at east one of the ground wheels of the harvester.

12. The harvester defined in claim further comprising a driver's cab disposed above the first crop conditioning means.

13. The harvester defined in claim 1, further comprising a movable, vertically disposed guide plate extending substantially parallel to the transport belt in the vicinity of each outer edge of the transport belt for adjusting the width of the mat of crop.

14. The harvester defined in claim 13, wherein the guide plates are pivotable about a vertical axis.

15. The harvester defined in claim 13, wherein the guide plates are displaceable perpendicular to the longitudinal axis of the transport belt.

16. The harvester defined in claim 1, wherein the crop cutting means is a drum cutter.

17. The harvester defined in claim 1, wherein the crop cutting means is a rotary cutter.

18. The harvester defined in claim further comprising adjustable means for driving the transport belt, thereby to permit adjustment of the speed of the transport belt.

19. The harvester defined in claim 1, further comprising adjustable means for driving the dosing roller, thereby to permit adjustment of the speed of rotation of the dosing roller.

* * * * *